Oct. 10, 1944. W. W. LEARY 2,359,924
CLOSURE
Filed May 24, 1941
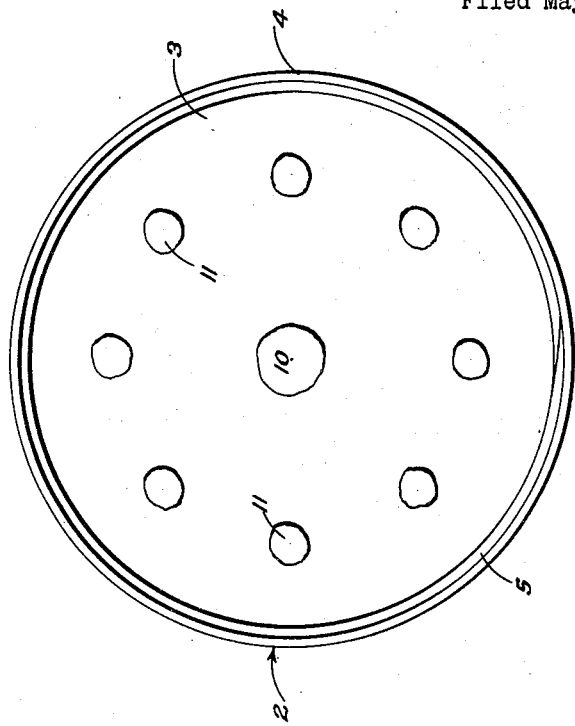
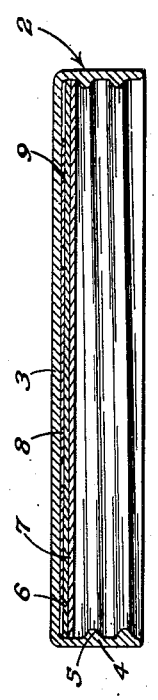
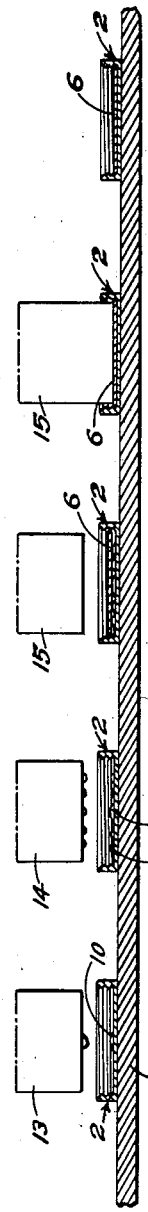
Inventor
William W. Leary
by
Walter J. Kaufman
Attorney Patented Oct. 10, 1944

2,359,924

UNITED STATES PATENT OFFICE 2,359,924

CLOSURE

William W. Leary, East Lampeter Township, Lancaster County, Pa., assignor to Armstrong Cork Company, Lancaster, Pa., a corporation of Pennsylvania Application May 24, 1941, Serial No. 394,985

6 Claims. (Cl. 215—43)

This invention relates to closures and more particularly, to molded closures including a lining material adhesively secured therein.

In the manufacture of molded closures, it is customary to adhere the liner to the closure by means of an adhesive and casein adhesives are frequently employed for this purpose. Casein adhesives generally comprise a solution of casein in an alkaline water carrier, and are non-tacky and non-adhesive when applied but become increasingly viscous, develop adhesive properties and set upon evaporation of the water carrier. Unfortunately, however, when casein adhesives are used in lining closures, the bond between the liner and the closure is dependent upon the two being in contact during the evaporation of the carrier; in mechanical lining of closures at the high speeds prevalent in the industry, frequently the liner may drop from the closure before the adhesive has become tacky or the liner is improperly disposed in the closure or may buckle and not be in engagement with the closure during the evaporation of the carrier, so that the liner is not bonded satisfactorily to the closure. A large amount of adhesive need be used and, since a large amount of water is present in the adhesive, absorption of such quantities of water by the pulpboard liner disfigures or discolors the liner and creates many unsalable closures due to their discolored, water-spotted appearance.

The chief object of my invention is to provide a molded closure having a sealing liner securely adhered thereto. A further object is to provide a molded closure having a sealing liner securely bonded thereto by two different types of adhesives, one of which securely holds the liner in contact with the closure during the activation of the second adhesive.

This invention relates to a closure for receptacles comprising a cover, a skirt extending from the cover, fastening means in said skirt adapted to secure the closure to a receptacle, lining material disposed adjacent the inner surface of said cover, a viscous, tacky adhesive interposed between said cover and the lining material, and a bonding medium securely bonding the lining material to said cover, said bonding medium being substantially non-tacky and of less viscosity than said adhesive when disposed in the closure, said adhesive serving to hold said lining material in contiguous relationship with said cover during the activation of said bonding medium.

The attached drawing illustrates a preferred embodiment of my invention, in which Figure 1 is a sectional view of the closure of my invention;

Figure 2 is a plan view of my closure prior to the application of the liner serving to illustrate the applied drops of adhesive and bonding medium; and Figure 3 is a diagrammatic view illustrating my method of lining molded closures.

Referring to the drawing, there is shown a molded closure 2 formed of any suitable synthetic resin such as urea-aldehyde or phenol-aldehyde condensation products. The closure 2 includes a cover 3 and a skirt 4 depending therefrom. Suitable screw threads 5 are molded on the interior surface of the skirt 4 and are adapted to engage similar threads on a receptacle to secure the closure thereto. A sealing liner or sealing layer of lining material 6 is disposed adjacent the interior of the cover 3 and is adapted to be compressed between the cover 3 and the lip of a receptacle to securely seal the same. The liner 6 may be formed of pulpboard, cork, cork composition or rubber. Preferably, a thin disk 7 of any suitable facing material is disposed over and conceals the lining material 6 as shown in Figure 1, to protect it against deterioration by the contents of a receptacle and consequent contamination of the contents of the receptacle.

The lining material 6 is secured to the interior surface of the cover in planar relationship thereto by means of an adhesive 8 and a bonding medium 9. For purposes of my invention it is essential that adhesive 8 be initially tacky while the bonding medium 9 is non-tacky and non-adhesive when disposed on the cover and adapted to be activated by evaporation and/or chemical reaction to become tacky and finally set to securely bond the liner 6 to the closure.

For use as adhesive 8, I have found a composition formed as follows to be highly satisfactory, the proportions being given by weight: castor oil 4 parts, rosin 4 parts, and milled rubber 2 parts. The rosin and milled rubber may be mixed together on a suitable mixing mill and incorporated with the castor oil. Other non-drying oils may, of course, be used in place of castor oil. Various rubber substitutes may be used in place of rubber, for example, polymerized chloroprene or ethylene polysulfide. The proportions of the ingredients may be varied, if desired, bearing in mind the essential requirements of an initially tacky adhesive which may be viscous and non-drying.

Preferably, the bonding medium 9 is normally non-adhesive when disposed in the closure, of less viscosity than the adhesive 8, and adapted to be activated by evaporation of its carrier and/or chemical reaction to become tacky, and set to securely bond the liner 6 to the closure. I have found a composition formed as follows to be suitable for my purpose, the proportions being given by weight: casein 60 parts, sodium phosphate 20 parts, sodium sulfite 10 parts, and lime 30 parts. The bonding medium is prepared for use by stirring together equal parts by weight of the above mix and water. After complete mixing, the mass may be permitted to lie dormant for a period of 15-30 minutes which permits the casein to swell. Additional water may then be added to form a mixture of the desired fluidity. Ammonium carbonate may be used in place of sodium sulfite while other suitable salts such as sodium carbonate, sodium oxalate, etc., may be used in place of sodium phosphate. If desired, other water soluble adhesive substances may be used in place of casein, such as glue, albumen, casein-latex mixtures or the like provided such substances meet the requirements set forth above.

The adhesive 8 is disposed in a drop or gob 10 in the approximate center of the cover 3. A plurality of drops 11 of bonding medium 9 are then disposed about the drop of adhesive 8. The liner 6 is then disposed in the closure and is pressed against the drop 10 of adhesive 8 and drops 11 of bonding medium 9 spreading them over the surface of the cover 3. The liner 6 is disposed in contiguous planar relationship to the cover 3 and is held in such position substantially in engagement therewith by the drop 10 of adhesive 8 during the evaporation of the carrier of the bonding medium 9. As the carrier evaporates, the bonding medium 9 is activated and becomes tacky and upon substantial evaporation of the carrier sets to securely bond the liner 6 to the cover 3.

The steps to be followed in practicing my method are illustrated diagrammatically in Figure 3. A closure 2 is disposed on a suitable base 12 and the drop 10 of adhesive 8 applied thereto by a suitable adhesive applying feeder 13. The closure 2 then passes on to a second station where a second feeder 14 is actuated to apply drops 11 of bonding medium 9 about the drop 10 in the form shown in Figure 2. Preferably, such drops 11 are disposed adjacent but not in contact with the drop 10. The liner 6 is then disposed in the closure 2 and is pressed against the drops 10 and 11 by means of a plunger 15 so that the drops are spread over the surface of the cover into contiguous relationship. The drop 10 of adhesive 8 holds the liner in proper position with respect to the cover 3 while the bonding medium 9 is activated by evaporation of its carrier to become tacky and set to securely bond the liner 6 to the closure 2. It will be appreciated that the adhesive 8 continues its adhesive relationship to the closure 2 and the liner 6 even after activation of the bonding medium 9 and assists the bonding medium 9 to securely bond the liner to the closure.

My invention obviates the disadvantages heretofore involved in lining molded closures. A considerable amount of bonding medium is saved since only a small number of drops are applied and this obviates in large part water-spotting or water-marking of liners and consequent closure waste. In the closure of my invention the liner is securely bonded to the cover and if desired may be protected from contact with the contained liquid of a receptacle with which the closure is used. The amount of adhesive required to effect a secure bond between the liner and closure is reduced thus effecting further economies in manufacture. The method of manufacture is economical, easily and simply conducted, and does not require vast expenditures for commercial plant.

While I have described and illustrated a preferred embodiment of my invention it will be understood the invention is not limited thereto since it may be otherwise practiced or embodied within the scope of the following claims.

I claim:

1. As a new article of manufacture, a closure for receptacles comprising a cover, a skirt extending from the cover, fastening means in said skirt adapted to secure the closure to a receptacle, lining material disposed adjacent the inner surface of said cover, a tacky adhesive interposed between said cover and the lining material and coating only a portion of the inner surface of the cover, and a bonding medium disposed upon another portion of the inner surface of the cover securely bonding the lining material to said cover, said bonding medium being substantially non-tacky and of less viscosity than said adhesive when disposed in the closure, said adhesive serving to hold said lining material in contiguous relationship with said cover during the activation of said bonding medium.

2. As a new article of manufacture, a closure for receptacles comprising a cover, a skirt extending from the cover, fastening means in said skirt adapted to secure the closure to a receptacle, lining material disposed adjacent the inner surface of said cover, a viscous, tacky, substantially non-drying adhesive interposed between said cover and the lining material and coating only a portion of the inner surface of the cover, and a bonding medium disposed upon another portion of the inner surface of the cover in contiguous relationship to said adhesive securely bonding the lining material to said cover, said bonding medium being substantially non-tacky and of less viscosity than said adhesive when disposed in the closure, said adhesive serving to hold said lining material in contiguous relationship with said cover during the activation of said bonding medium.

3. A closure according to claim 2, in which the bonding medium comprises the dried residue of a solution including casein and water.

4. A closure according to claim 2 in which the viscous, tacky, non-drying adhesive includes a non-drying oil, rosin and rubber.

5. A closure according to claim 2 in which the bonding medium comprises the dried residue of a solution including casein, lime and water and the tacky, non-drying adhesive includes approximately equal proportions of castor oil and rosin, and rubber in less amount than the amount of castor oil.

6. As a new article of manufacture, a molded closure for receptacles comprising a cover, a skirt extending from the cover, screw threads in said skirt adapted to engage similar threads on a receptacle to secure the closure thereto, lining material disposed adjacent the inner surface of said cover, a viscous, tacky, substantially non-drying adhesive interposed between the cover and the lining material and coating only a portion of the inner surface of the cover, said adhesive including a non-drying oil, rosin and rubber, and a bonding medium disposed upon another portion of the inner surface of the cover spaced from the non-drying adhesive securely bonding the lining material to said cover, said bonding medium being substantially non-tacky and of less viscosity than said adhesive when disposed in the closure and comprising the dried residue of a solution including casein and water, said non-drying adhesive serving to hold said lining material in contiguous relationship with said cover during the activation of said bonding medium.

WILLIAM W. LEARY.